(12) United States Patent
Amirishetty et al.

(10) Patent No.: US 12,124,376 B2
(45) Date of Patent: *Oct. 22, 2024

(54) ELASTIC COLUMNAR CACHE FOR CLOUD DATABASES

(71) Applicant: Google LLC, Mountain View, CA (US)

(72) Inventors: Anjan Kumar Amirishetty, Freemont, CA (US); Xun Cheng, Dublin, CA (US); Viral Shah, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/660,374

(22) Filed: Apr. 22, 2022

(65) Prior Publication Data
US 2022/0253383 A1 Aug. 11, 2022

Related U.S. Application Data

(63) Continuation of application No. 16/932,874, filed on Jul. 20, 2020, now Pat. No. 11,334,489.

(51) Int. Cl.
*G06F 12/08* (2016.01)
*G06F 9/50* (2006.01)
(Continued)

(52) U.S. Cl.
CPC ........ *G06F 12/0871* (2013.01); *G06F 9/5016* (2013.01); *G06F 12/0891* (2013.01);
(Continued)

(58) Field of Classification Search
CPC .............. G06F 12/0871; G06F 16/221; G06F 16/24552; G06F 16/278; G06F 9/5016;
(Continued)

(56) References Cited

U.S. PATENT DOCUMENTS 10,120,582 B1 * 11/2018 Farhan .................... G06F 11/34
2005/0049992 A1    3/2005 Gupta
(Continued)

OTHER PUBLICATIONS

Indian Examination Report for the related Applicaiton No. 202347009659, dated Jul. 27, 2023, 6 pages.

*Primary Examiner* — Hua J Song
(74) *Attorney, Agent, or Firm* — Honigman LLP; Brett A. Krueger

(57) ABSTRACT

A method for providing elastic columnar cache includes receiving cache configuration information indicating a maximum size and an incremental size for a cache associated with a user. The cache is configured to store a portion of a table in a row-major format. The method includes caching, in a column-major format, a subset of the plurality of columns of the table in the cache and receiving a plurality of data requests requesting access to the table and associated with a corresponding access pattern requiring access to one or more of the columns. While executing one or more workloads, the method includes, for each column of the table, determining an access frequency indicating a number of times the corresponding column is accessed over a predetermined time period and dynamically adjusting the subset of columns based on the access patterns, the maximum size, and the incremental size.

18 Claims, 7 Drawing Sheets

(51) Int. Cl.
  *G06F 12/0871*   (2016.01)
  *G06F 12/0891*   (2016.01)
  *G06F 16/22*     (2019.01)
  *G06F 16/2455*   (2019.01)
  *G06F 16/27*     (2019.01)

(52) U.S. Cl.
  CPC ...... *G06F 16/221* (2019.01); *G06F 16/24552* (2019.01); *G06F 16/278* (2019.01)

(58) Field of Classification Search
  CPC ......... G06F 12/0891; G06F 2212/1016; G06F 2212/163; G06F 2212/465; G06F 12/0875; G06F 12/0893
  USPC .......................................................... 711/118
  See application file for complete search history.

(56) References Cited

U.S. PATENT DOCUMENTS

| | | | |
|---|---|---|---|
| 2014/0281247 A1 | 9/2014 | Loaiza et al. | |
| 2017/0116269 A1* | 4/2017 | Macnicol | G06F 3/067 |
| 2021/0224235 A1* | 7/2021 | Arnaboldi | G06F 16/284 |

* cited by examiner

ELASTIC COLUMNAR CACHE FOR CLOUD DATABASES

CROSS REFERENCE TO RELATED APPLICATIONS

This U S. patent application is a continuation of, and claims priority under 35 U.S.C § 120 from, U.S. patent application Ser. No. 16/932,874, filed on Jul. 20, 2020. The disclosure of this prior application is considered part of the disclosure of this application and is hereby incorporated by reference in its entirety.

TECHNICAL FIELD

This disclosure relates to elastic columnar cache for cloud databases.

BACKGROUND

Cloud databases are often massive in size and are stored in a row-major format. That is, elements of rows are stored contiguous in memory (i.e., consecutively). However, data requests (e.g., from a user) are commonly column-centric. For example, a user requests an employee identification (i.e., a column of data) for each employee in a database. In this scenario, storage in a row-major format significantly impacts response speed, as the required data is split across a large number of locations in memory. To combat this, cloud databases often implement columnar cache. This cache stores one or more columns of the database in a column-major format. The size of the columnar cache and which columns are stored within the cache are typically static and require a reboot to change.

SUMMARY

One aspect of the disclosure provides a method for providing elastic columnar cache. The method includes receiving, at data processing hardware, cache configuration information indicating a maximum size and an incremental size for a cache associated with a user. The cache is configured to store a portion of a table stored on memory hardware in communication with the data processing hardware. The table is stored on the memory hardware in a row-major format and includes a plurality of columns and a plurality of rows. The method also includes caching, by the data processing hardware, in a column-major format, a subset of the plurality of columns of the table in the cache associated with the user. The method includes receiving, at the data processing hardware, a plurality of data requests. Each data request requests access to the table stored on the memory hardware and associated with a corresponding access pattern requiring access to one or more of the plurality of columns of the table.

The method includes, while executing one or more workloads on the data processing hardware, and for each column of the plurality of columns of the table, determining, by the data processing hardware, an access frequency indicating a number of times the corresponding column is accessed over a predetermined time period based on the corresponding access pattern associated with each of the plurality of data requests. The method also includes dynamically adjusting, by the data processing hardware, the subset of the plurality of columns cached in the column-major format in real-time based on the access patterns, the maximum size for the cache, and the incremental size for the cache.

Implementations of the disclosure may include one or more of the following optional features. In some implementations, dynamically adjusting the subset of the plurality of columns cached in the column-major format includes removing one or more columns from the subset of the plurality of columns in the cache. The removed one or more columns are associated with access frequencies that satisfy a contraction access frequency threshold. Optionally, dynamically adjusting the subset of the plurality of columns cached in the column-major format includes adding one or more columns to the subset of the plurality of columns in the cache. The added one or more columns are associated with access frequencies that satisfy an expansion access frequency threshold.

In some examples, the column-major format includes a virtual horizontal partitioning of the row-major format. The caching the subset of the plurality of columns may include generating one or more table fragments each including a respective portion of one or more of the plurality of columns of the table. In some implementations, the cache includes shared memory accessible by the one or more workloads executing on the data processing hardware.

Dynamically adjusting the subset of the plurality of columns cached in the column-major format may include dynamically adjusting the subset of the plurality of columns cached in the column-major format without restarting any of the one or more workloads. In some examples, dynamically adjusting the subset of the plurality of columns cached in the column-major format includes one of increasing a size of the cache by an amount equal to the incremental size or decreasing the size of the cache by the amount equal to the incremental size.

Optionally, the method further includes, prior to dynamically adjusting the subset of the plurality of columns by increasing the size of the cache by the amount equal to the incremental size, determining, by the data processing hardware, whether increasing the cache by the amount equal to the incremental size exceeds the maximum size. When increasing the cache by the amount equal to the incremental size would exceed the maximum size, the method includes declining, by the data processing hardware, to increase the size of the cache. In some implementations, the cache includes a plurality of segments and dynamically adjusting the subset of the plurality of columns cached in the column-major format includes grouping columns together in segments based on the access patterns. Grouping the columns in segments based on the access patterns may include grouping infrequently accessed columns together.

Another aspect of the disclosure provides a system for elastic columnar cache. The system includes data processing hardware and memory hardware in communication with the data processing hardware. The memory hardware stores instructions that when executed on the data processing hardware cause the data processing hardware to perform operations. The operations include receiving cache configuration information indicating a maximum size and an incremental size for a cache associated with a user. The cache is configured to store a portion of a table stored on memory hardware in communication with the data processing hardware. The table is stored on the memory hardware in a row-major format and includes a plurality of columns and a plurality of rows. The operations also include caching, in a column-major format, a subset of the plurality of columns of the table in the cache associated with the user. The operations include receiving a plurality of data requests. Each data request requests access to the table stored on the memory hardware and associated with a corresponding access pattern requiring access to one or more of the plurality of columns of the table.

The operations include, while executing one or more workloads on the data processing hardware, and for each column of the plurality of columns of the table, determining an access frequency indicating a number of times the corresponding column is accessed over a predetermined time period based on the corresponding access pattern associated with each of the plurality of data requests. The operations also include dynamically adjusting the subset of the plurality of columns cached in the column-major format in real-time based on the access patterns, the maximum size for the cache, and the incremental size for the cache.

This aspect may include one or more of the following optional features. In some implementations, dynamically adjusting the subset of the plurality of columns cached in the column-major format includes removing one or more columns from the subset of the plurality of columns in the cache. The removed one or more columns are associated with access frequencies that satisfy a contraction access frequency threshold. Optionally, dynamically adjusting the subset of the plurality of columns cached in the column-major format includes adding one or more columns to the subset of the plurality of columns in the cache. The added one or more columns are associated with access frequencies that satisfy an expansion access frequency threshold.

In some examples, the column-major format includes a virtual horizontal partitioning of the row-major format. The caching the subset of the plurality of columns may include generating one or more table fragments each including a respective portion of one or more of the plurality of columns of the table. In some implementations, the cache includes shared memory accessible by the one or more workloads executing on the data processing hardware.

Dynamically adjusting the subset of the plurality of columns cached in the column-major format may include dynamically adjusting the subset of the plurality of columns cached in the column-major format without restarting any of the one or more workloads. In some examples, dynamically adjusting the subset of the plurality of columns cached in the column-major format includes one of increasing a size of the cache by an amount equal to the incremental size or decreasing the size of the cache by the amount equal to the incremental size.

Optionally, the operations further include, prior to dynamically adjusting the subset of the plurality of columns by increasing the size of the cache by the amount equal to the incremental size, determining whether increasing the cache by the amount equal to the incremental size exceeds the maximum size. When increasing the cache by the amount equal to the incremental size would exceed the maximum size, the operations include declining to increase the size of the cache. In some implementations, the cache includes a plurality of segments and dynamically adjusting the subset of the plurality of columns cached in the column-major format includes grouping columns together in segments based on the access patterns. Grouping the columns in segments based on the access patterns may include grouping infrequently accessed columns together.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
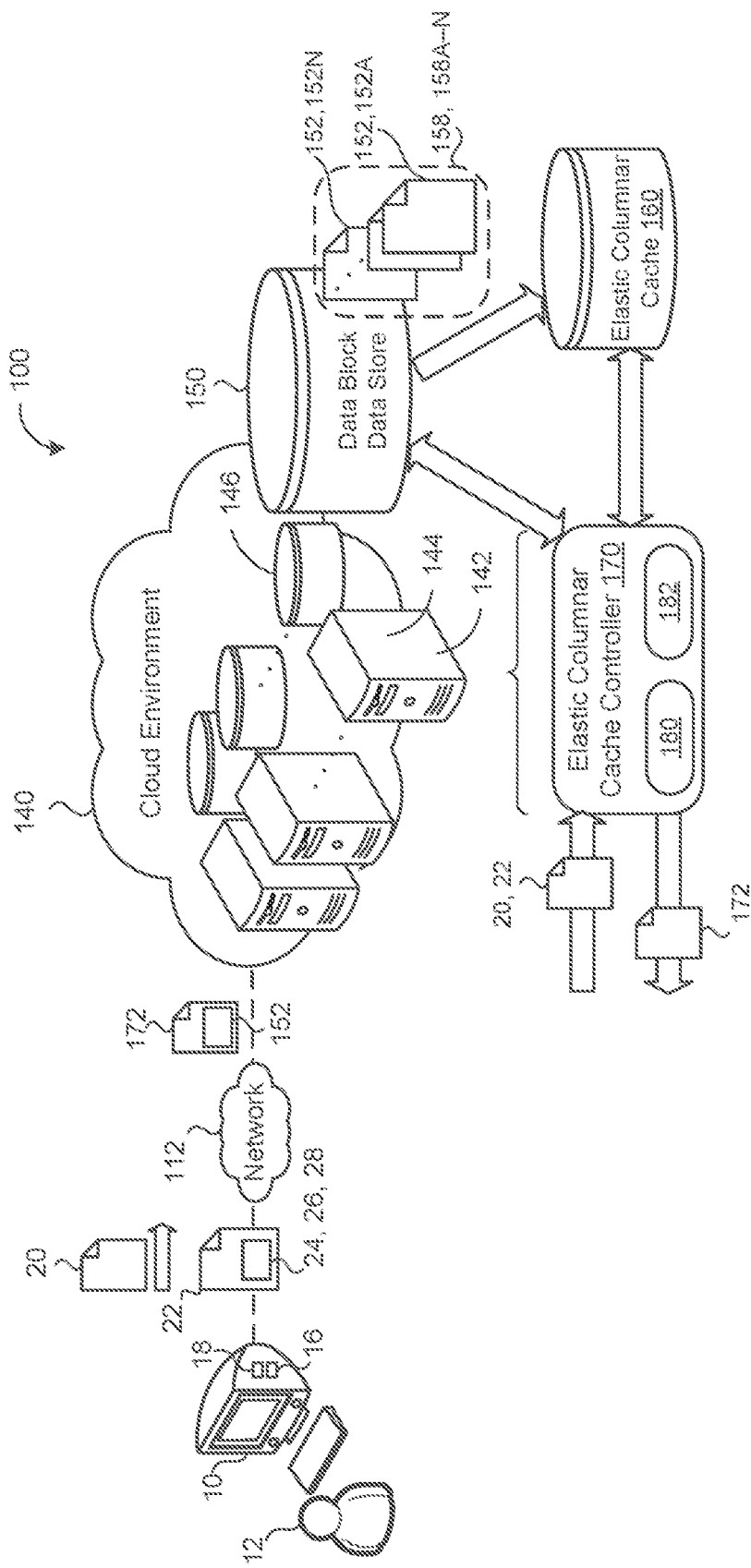
FIG. 1 is a schematic view of an example system for an elastic columnar cache.

Database systems (e.g., cloud database systems) usually include some amount of shared memory to serve as cache to store frequently accessed data in a column-major format. This cache is used to greatly increase access speed to the frequently accessed data versus data stored in a row-major format (e.g., data stored on hard disk). This "in-memory cache" feature serves analytical queries efficiently by caching subsets of tables/columns of a database in a column-major format in-memory. Columnar cache improves performance by reading in only relevant columns (based on the query) with better compression support and with vectorized execution.

Conventionally, these cloud database systems statically allocate the shared memory and lock the size (and the columns stored within) of the columnar cache at a startup of the system or instance. Because the columnar cache size is determined at the server startup and is static, users cannot increase or decrease the size of the cache without restarting the server.

When running analytical workloads, query patterns (e.g., patterns of queries from users requesting access to the data stored within the database) often reveal that queries access a set of tables/columns more frequently than other tables/columns. Additionally, there may be columns stored in the cache (i.e., columns selected at startup) that are never or rarely accessed. Because the columnar cache size is static, database servers cannot release the shared columnar cache memory for the tables/columns that are infrequently accessed by the workload to replace them with columns/tables that are more frequently accessed (thus increasing the effectiveness of the cache). Moreover, database servers generally cannot increase the size of the shared columnar cache memory to add more tables/columns to the cache beyond the statically defined capacity (i.e., defined at startup).

Implementations herein are directed toward an elastic columnar cache system for cloud databases. The system implements columnar cache that stores data in terms of table fragments which includes a virtual horizontal partitioning of row-major data. That is, rows of several contiguous blocks (from data stored in a row-major format) are converted into column-major format, thereby resulting in an independent and self-describing table fragment. Within the table fragment, all the values of a column may be stored together physically in sorted order to enable faster aggregations and predicate-filtering.

The elastic columnar cache system automatically determines and designates frequently accessed tables and/or columns for columnar cache. The system dynamically allocates the required shared memory (while the database is running) to store the designated tables/columns in the shared memory. The system also reclaims shared memory back when the cached columns or tables are no longer required (i.e., are infrequently accessed). Thus, the elastic columnar cache system provides run-time elasticity by expanding and contracting/shrinking shared memory for columnar cache transparently to the user. Because users are often billed based on the amount of memory dedicated or allocated to the user, the elastic columnar cache system not only provides more efficient and effective use of shared memory, but may also reduce costs.

Referring now to FIG. 1, in some implementations, an example columnar cache system 100 includes a remote system 140 in communication with one or more user devices 10 via a network. The remote system 140 may be a single computer, multiple computers, or a distributed system (e.g., a cloud environment) having scalable/elastic resources 142 including computing resources 144 (e.g., data processing hardware) and/or storage resources 146 (e g., memory hardware). A data block data store 150 (i.e, a remote storage device) may be overlain on the storage resources 146 to allow scalable use of the storage resources 146 by one or more of the clients (e.g., the user device 10) or the computing resources 144. The data store 150 is configured to store a plurality of data blocks 152,152a-n within one or more tables 158, 158a-n (i.e., a cloud database) that each include a plurality of rows and columns 310, 310Aa-Nn (FIG. 3). The data store 150 may store any number of tables 158 at any point in time. In some examples, the tables 158 are stored using a row-major format. That is, each data block 152 is stored such that consecutive elements of a row are contiguous in memory.

The remote system 140 also includes an elastic columnar cache 160 configured to store one or more columns of one or more tables 158 in a column-major format. That is, the elastic columnar cache 160 stores a portion of the one or more tables 158 stored at the data block data store 150 in a manner such that consecutive elements of a column 310 are contiguous. The elastic columnar cache 160 may include shared memory that is accessible to any number of processes (e.g., workloads or applications) executing on the remote system 140. Optionally, the elastic columnar cache includes memory with faster access limes than the data block data store 150. For example, the data block data store 150 is a hard disk or other non-volatile memory while the elastic columnar cache 160 is random access memory.

Figure 2:
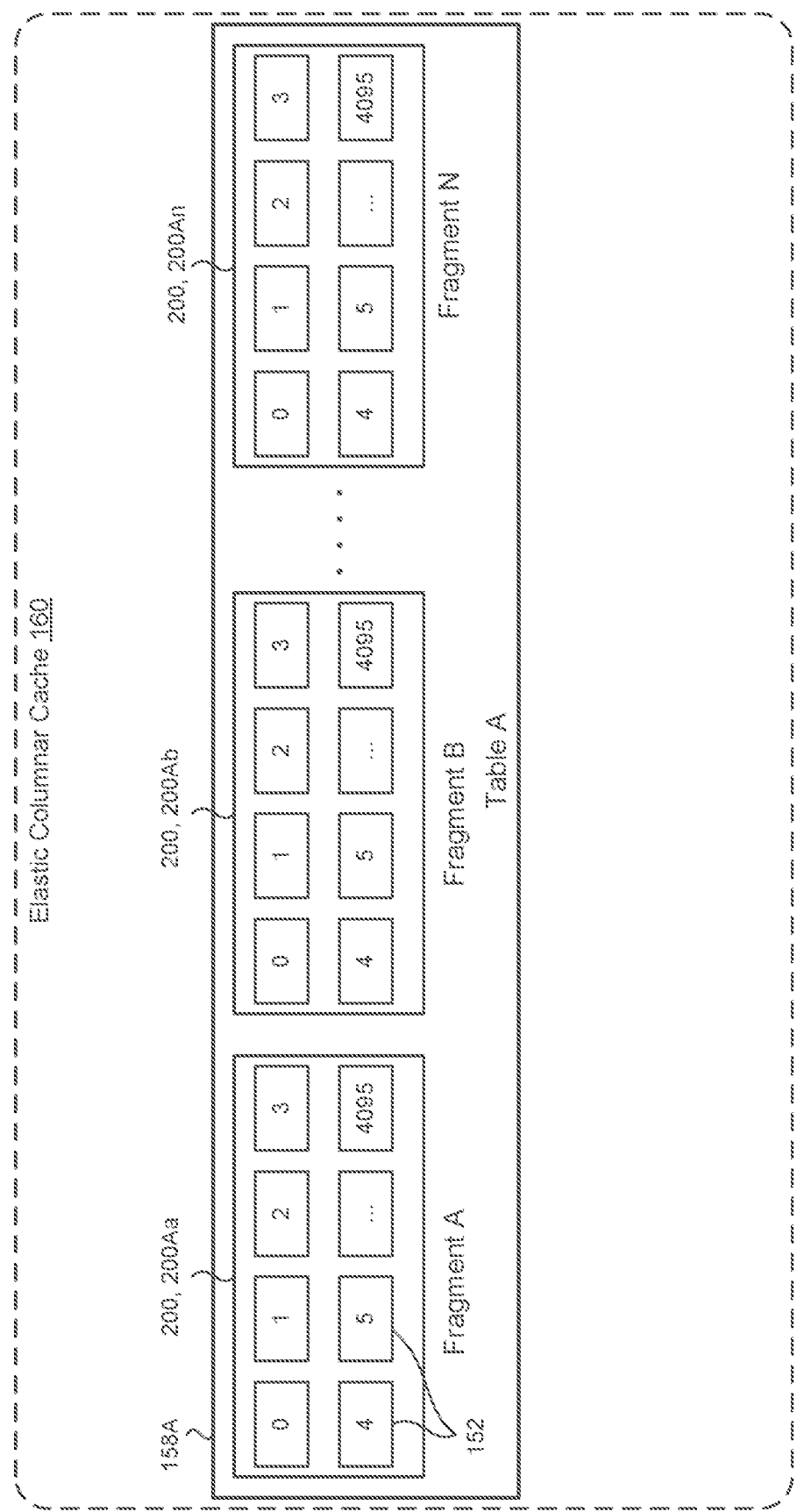
FIG. 2 is a schematic view of exemplary components of an elastic columnar cache.

Referring now to FIG. 2, in some examples, the elastic columnar cache 160 includes one or more table fragments 200, 200Aa-Nn for each table 158 with each table fragment 200 including a respective portion of one or more columns 310 of one or more tables 158. The table fragments 200 represent a virtual horizontal partitioning of data blocks in a row-major format (i.e., the data blocks 152 stored at the data block data store 150). Each table fragment 200 may include a fixed number of data blocks 152 (e.g., 4096 data blocks 152) that represent values of a column 310 stored in a sorted order. That is, each table fragment 200 includes sorted data blocks 152 of one or more columns 310 of a table 158. In the example shown, the elastic columnar cache 160 includes N table fragments 200 for Table A 158A and each table fragment 200 includes 4096 data blocks 152 representing one or more columns 310 of the table 158A. The elastic columnar cache 160 may include any number of table fragments 200, and each table fragment 200 may include any number of data blocks 152. While in some implementations, each table fragment 200 is the same size (i.e., includes the same number of data blocks 152), in other implementations, table fragments 200 are different sizes.

In some examples, an entirety of a column 310 is contiguous in one or more table fragments 200. In other examples, columns 310 may be split among two or more table fragments 200. This allows the system 100, during the execution of a data request 20, to skip and/or filter table fragments 200 that do not satisfy predicates specified in data request. For example, the controller 170 maintains a minimum and a maximum column value for every column 310 in each table fragment 200. The minimum and maximum column values for each table fragment 200 may represent only the data present in the respective table fragment 200, which provides faster predicate pruning. For example, several table fragments 200 may be quickly eliminated by simply applying predicates on minimum and maximum values when processing the data request 20.

Referring back to FIG. 1, the remote system 140 is configured to receive data requests 20 (i.e., queries) from a user device 10 associated with a respective user 12. The user device 10 may correspond to any computing device, such as a desktop workstation, a laptop workstation, or a mobile device (i.e., a smart phone). The user device 10 includes computing resources 18 (e.g., data processing hardware) and/or storage resources 16 (e.g., memory hardware). Each data request 20 requests the remote system 140 to read and/or write one or more data blocks 152 stored within the tables 158 on the data block data store 150.

The remote system 140 executes an elastic columnar cache controller 170. The controller 170 receives cache configuration information 22 directly or indirectly from the user device 10. The cache configuration information 22, in some implementations, indicates a maximum size 24 and an incremental size 26 of the columnar cache 160. Optionally, the cache configuration information 22 includes an initial size 28 of the columnar cache 160. The maximum size 24 indicates to the controller 170 a maximum amount of cache (i.e., memory) that may be allocated by the remote system 140 for use by the user 12 associated with the cache configuration information 22. The incremental size 26 indicates an amount of memory that the controller 170 may increase or decrease a size of the elastic columnar cache 160 by when dynamically adjusting the size of the cache 160. That is, the incremental size 26 defines the amount of memory that the controller 170 may allocate to, or deallocate from, the elastic columnar cache 160 when dynamically adjusting the size of the cache 160.

For example, the cache configuration information 22 indicates that the maximum size 24 is four gigabytes and the incremental size 26 is one gigabyte. In this example, the controller 170 may allocate a maximum of four gigabytes of elastic columnar cache 160 at any one time to the user 12 and may increase or decrease the current amount allocated to the user 12 by one gigabyte at a time (up to the maximum size 24 of four gigabytes). For instance, when there is two gigabytes allocated to the user 12, the controller 170 may expand the total amount allocated to the user 12 up to three gigabytes or shrink the total amount allocated to the user 12 down to two gigabytes, in some examples, the initial size 28 indicates to the controller 170 an initial size of the elastic columnar cache 160. The initial size 28 may also represent a minimum size of the elastic columnar cache 160. For example, when the initial size 28 is one gigabyte, the controller 170 may initialize the elastic columnar cache 160 to one gigabyte and may not reduce the total size allocated to the user 12 to less than one gigabyte.

Based on the cache configuration information 22, the controller 170 caches a subset of the plurality of columns 310 of one or more tables 158 associated with the user 12 into the elastic columnar cache 160 using a column-major format. The user 12 may select the initial columns 310 cached in the elastic columnar cache 160. Alternatively, the controller 170 may select the columns 310 (e.g., randomly or based on data associated with the user 12, other users, or tables 158). The controller 170 may cache a sufficient quantity of columns 310 to fill the elastic columnar cache 160 to the initial size 28. The quantity of columns 310 cached by the controller 170 is dependent upon the size of the columns 310 (i.e, the number of rows in the table 158) and the cache configuration information 22 (e g., the initial size 28).

With continued reference to FIG. 1, the controller 170 receives one or more data requests 20 (i.e., queries) from the user device 10 each requesting access to one or more tables 158 stored on the data block data store 150. The elastic columnar cache controller 170 determines if the data requested in each receive data request 20 is present within the elastic columnar cache 160 (i.e., a "cache hit"). When the requested data is available in the cache 160, the controller 170 fetches the data 152 from the cache 160 and sends a query response 172 containing the requested data 152 to the user 12 via the user device 10. When the requested data is not available or is only partially available in the elastic columnar cache 160 (i.e. a "cache miss"), the controller 170 retrieves the requested data 152 from the data block data store 150 and sends the query response 172 containing the requested data 152 to the user 12 via the user device 10.

While executing one or more workloads on the remote system 140 (e.g., processes that have or request access to the elastic columnar cache 160 and/or the data block data store 150), the elastic columnar cache controller 170 stores or otherwise retains an access pattern 180 associated with each data request 20. The access pattern 180 includes which columns 310 the controller 170 accesses in order to respond to the data request 20. As the controller 170 stores access patterns 180 for each data request 20, the controller 170 may determine an access frequency 182 for each column 310 that indicates a frequency that data requests 20 access the respective column 310 of a respective table 158 over a predetermined time period based on the corresponding access patterns 180. For example, the access frequencies 182 indicate that some columns 310 are never, or infrequently, accessed (e.g., weekly or monthly) by data requests 20 and other columns 310 are frequently accessed by data requests (e.g., hourly, or daily).

The elastic columnar cache controller 170, while still executing the one or more workloads, dynamically adjusts the subset of columns 310 cached in the column-major format in the elastic columnar cache 160 in real-time based on the access patterns 180 and the access frequencies 182, and the cache configuration information 22 (e.g., the maximum size 24 and the incremental size 26). That is, the elastic columnar cache controller 170 determines which columns 310 are frequently accessed and which columns 310 are infrequently accessed based on the access frequencies 182 and dynamically adjusts the elastic columnar cache 160 so that frequently accessed columns 310 are present in the cache 160 and less frequently accessed columns 310 are not present in the cache 160. Permitting the controller 170 to dynamically adjust the elastic columnar cache 160 leads to more "cache hits" while keeping the total size of the cache 160 allocated to the user 12 within the maximum size 24 indicated by the cache configuration information 22. In some examples, the controller 170 adjusts the size of cache 160 by increasing the size by an amount equal to the incremental size 26 or decreasing the size of the cache 160 by the amount equal to the incremental size 26. Thus, the controller 170 dynamically adjusts the subset of columns 310 cached in the column-major format without restarting any workloads with access to the cache 160 (i.e., the shared memory).

Figure 3A:
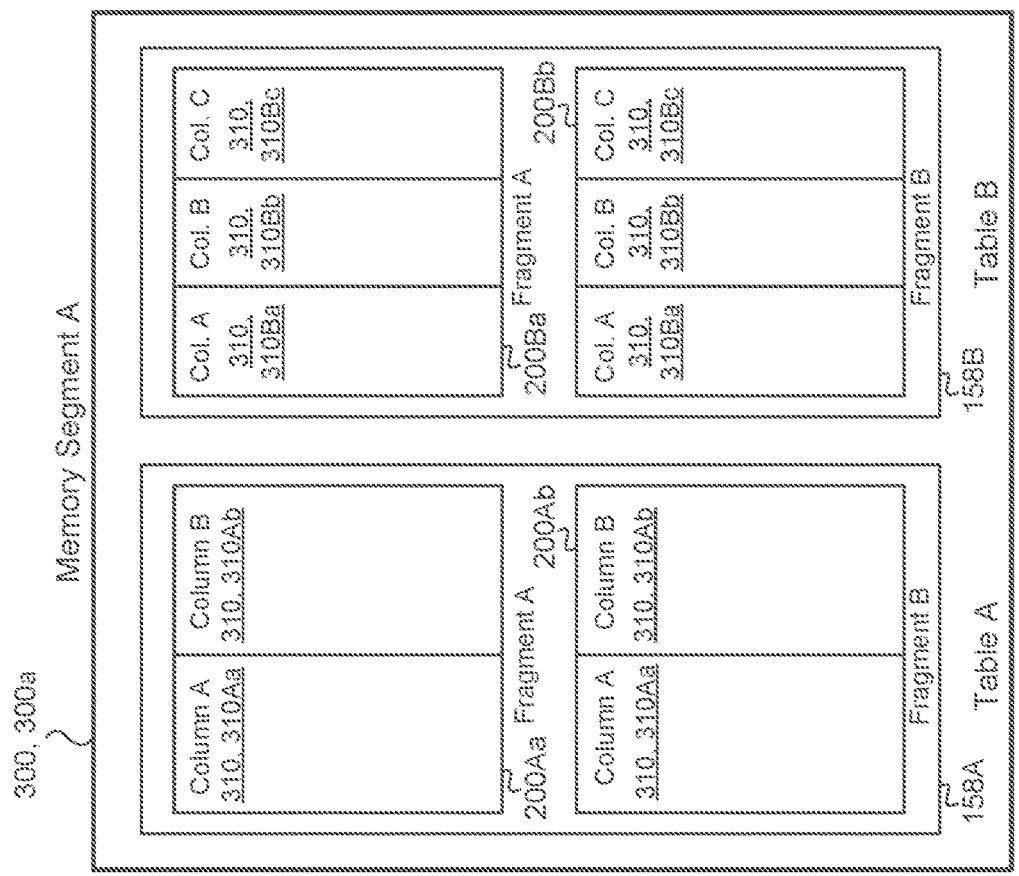
FIGS. 3A-3C are schematic views of dynamically expanding and contracting memory segments of an elastic columnar cache.
Figure 3B:
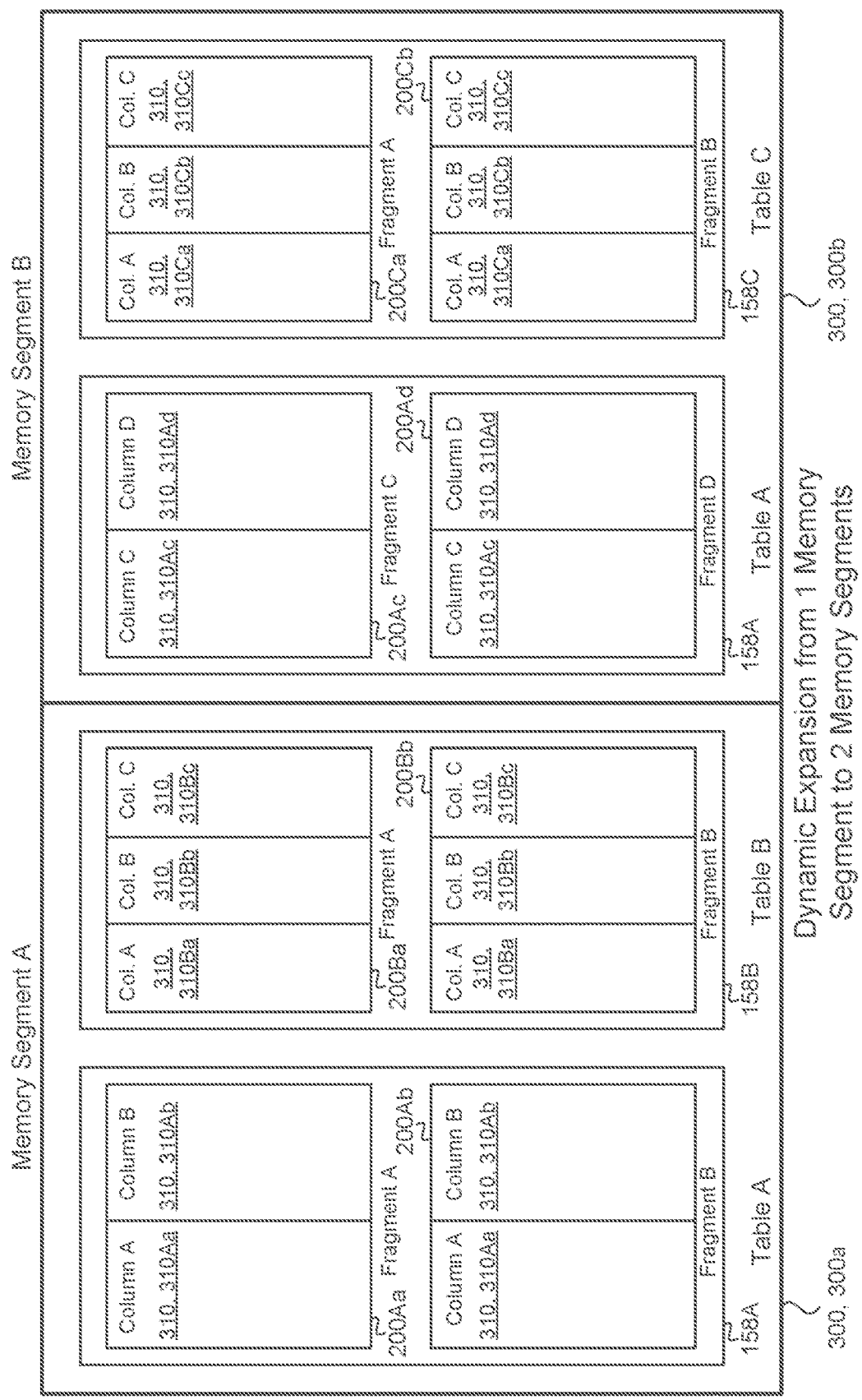
Figure 3C:
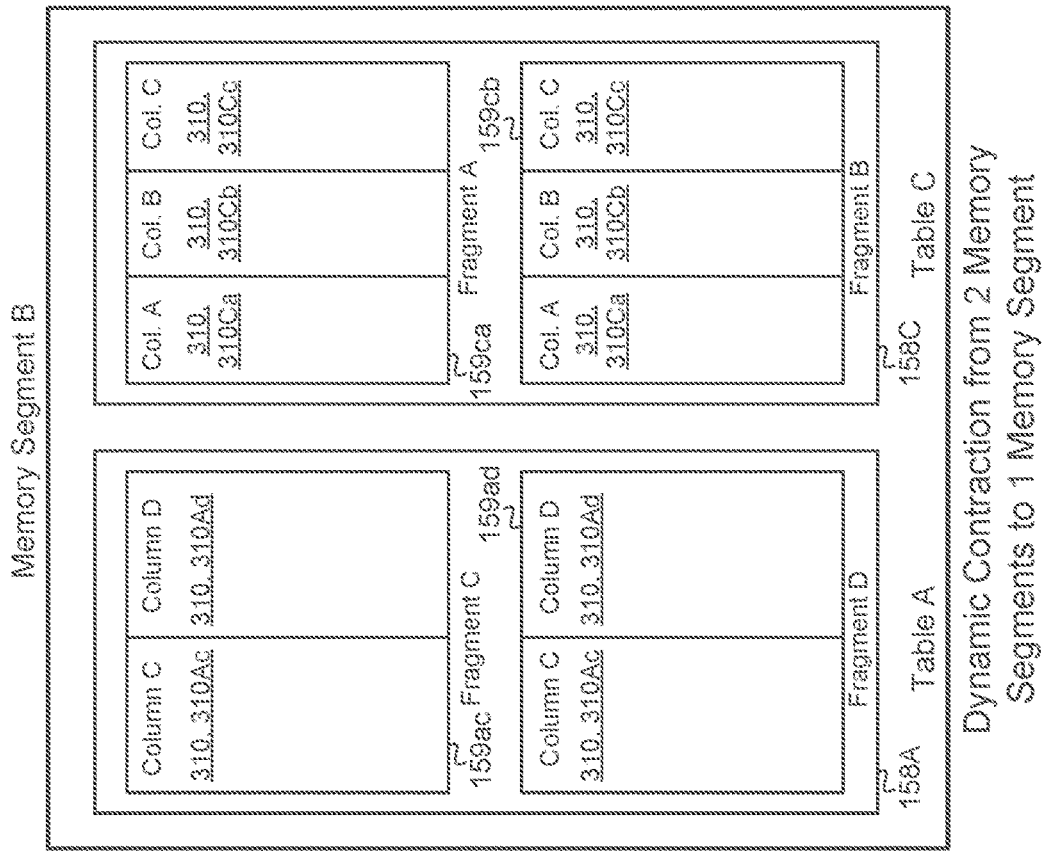

Referring now to FIGS. 3A-3C, in some implementations, the elastic columnar cache 160 includes one or memory segments 300, 300a-n. Each memory segment 300 may be a fixed size that is equal to the incremental size 26 defined in the cache configuration information 22. For example, when the incremental size 26 is one gigabyte, each memory segment 300 is one gigabyte in size. Thus, when dynamically adjusting the columns 310 cached in the elastic columnar cache 160, the controller 170 may increase or decrease the size of the cache 160 (as needed) by one memory segment 300 at a time. In the example shown in FIG. 3A, a memory segment 300a includes portions of table A 158A and table B 158B. The table A 158A portion includes two table fragments 200Aa, 200Ab. The fragments 200Aa, 200Ab include column A 310Aa and column B 310Ab of table A 158A. The table B 158B portion also includes two table fragments 200Ba, 200Bb, but in this case, the table fragments 200Ba, 200Bb include three columns 310Ba, 310Bb, 310Bc.

In some examples, dynamically adjusting the subset of columns 310 cached in the column-major format in the elastic columnar cache 160 includes adding one or more columns 310 to the subset that are associated with access frequencies 182 that satisfy an expansion access frequency threshold. As shown in FIG. 3B, adding columns 310 may include adding an additional memory segment 300. Here, the controller 170 dynamically expands the elastic columnar cache 160 from one memory segment 300 (i.e., memory segment A 300a) to two memory segments 300a, 300b. The second memory segment 300b includes additional columns 310 of table A 158A and columns 310 from a new table C 158C. That is, in this case, the access patients 180 and access frequencies 182 indicate that column C 31Aac and column D 310Ad of table A 158A and that column A 310Aa, column B 310Cb, and column C 310Cc of table C 158C are accessed frequently enough to satisfy the expansion access frequency threshold and thus warrant inclusion within the elastic columnar cache 160. In this example, the controller 170 dynamically adjusts (i.e., without restarting any workloads, processes, or applications) the elastic columnar cache 160 by doubling the size with the addition of a second memory segment 300b.

The controller 170 may also add columns 310 to the elastic columnar cache 160 without adding an additional memory segment 300. For example, the controller 170 may add the columns to an existing memory segment by taking advantage of previously unused portions of the memory segment 300 or by replacing less frequently accessed columns 310 in the memory segment 300.

In some implementations, the controller 170 dynamically adjusts the subset of the columns 310 cached in the column-major format by removing one or more columns 310 from the subset that are associated with access frequencies 182 that fail to satisfy a contraction access frequency threshold. The contraction access frequency may be the same as the expansion access frequency or a different threshold altogether. In the example shown in FIG. 3C, the controller 170 dynamically contracts the amount of cache allocated to the user 12 by releasing the shared memory associated with memory segment A 300a and leaving only memory segment B 300b allocated to the user 12. That is, in this case, the access frequencies 182 for the columns 310 cached in memory segment A 300a (i.e., columns 310Aa, 310Ab, 310Ba, 310Bb, 310Bc) satisfy the contraction access frequency threshold. For example, the access frequencies 182 associated with columns 310Aa, 310Ab, 310Ba, 310Bb, 310Bc indicate that these columns are infrequently accessed and thus the controller 170 may safely recover the memory associated with memory segment A 300a.

In some examples, the controller 170 groups or assembles or otherwise gathers columns 310 together into segments 300 based on the access patterns 180 and/or the access frequencies 182. For example, the controller 170 groups columns 310 that are most frequently accessed into the same memory segments) 300 and columns 310 that are least frequently accessed into the same memory segments) 300. Returning to the example of FIG. 3B, the columns 310Aa, 310Ab, 310Ba, 310Bb, 310Bc may be grouped into memory segment A 300a based on the corresponding access patterns 180 indicating that these columns are more frequently accessed than the columns 310Ac, 310Ad, 310Ca, 310Cb, 310Cc of memory segment B 300b. This enables the controller 170 to more easily and effectively expand and contract the size of the elastic columnar cache 170 as the controller 170 generally must wait for all current accesses to a memory segment 300 to complete prior to adjusting (e.g., removing) the memory segment 300. Thus, by decreasing the accesses to a memory segment 300 (i.e., by grouping infrequently accessed columns 310), the controller 170 will more easily recover the memory segment 300 when dynamically contracting or shrinking the size of the elastic columnar cache 160.

In some examples, prior to dynamically adjusting the subset of the columns 310 cached by increasing the size of the cache 160 by the amount equal to the incremental size 26, the controller 170 determines whether increasing the cache exceeds the maximum size 24 of the cache 160. When increasing the cache 160 would exceed the maximum size 24, the controller 170 may decline to increase the size of the cache 160. Instead, the controller 170 may adjust the columns 310 grouped in one or more of the existing memory segments 300.

For example, with continued reference to FIG. 3B, when each memory segment 300 is one gigabyte in size and when the maximum size of the cache 160 is two gigabytes, the two memory segments 300a, 300b allocate the maximum amount of cache 160 to the associated with the user 12. In this instance, when the access patterns 180 indicate that additional columns 310 should be added to the cache 160, the controller 170, instead of increasing the size of the cache 160, may replace one or more columns 310 that are less frequently accessed in one of the memory segments 300a, 300b. When none of the currently cached columns 310 are accessed less frequently than the new columns 310 to be cached, the controller 170 may instead decline any action, and instead wait for the access patterns to change. For example, after a period of time, one or more columns 310 may be accessed less frequently, and at that time, the controller 170 may adjust the cached columns 310 based on the corresponding access patterns 180. Alternatively, the controller 170 may receive a new maximum size 24 from the user 12 that allows the controller 170 to further increase the size of the cache 160. In some examples, the remote system 140 may notify the user 12 when the cache 160 reaches the maximum size and/or when the controller 170 is unable to increase the size of the cache 160 based on the maximum size 24.

Figure 4:
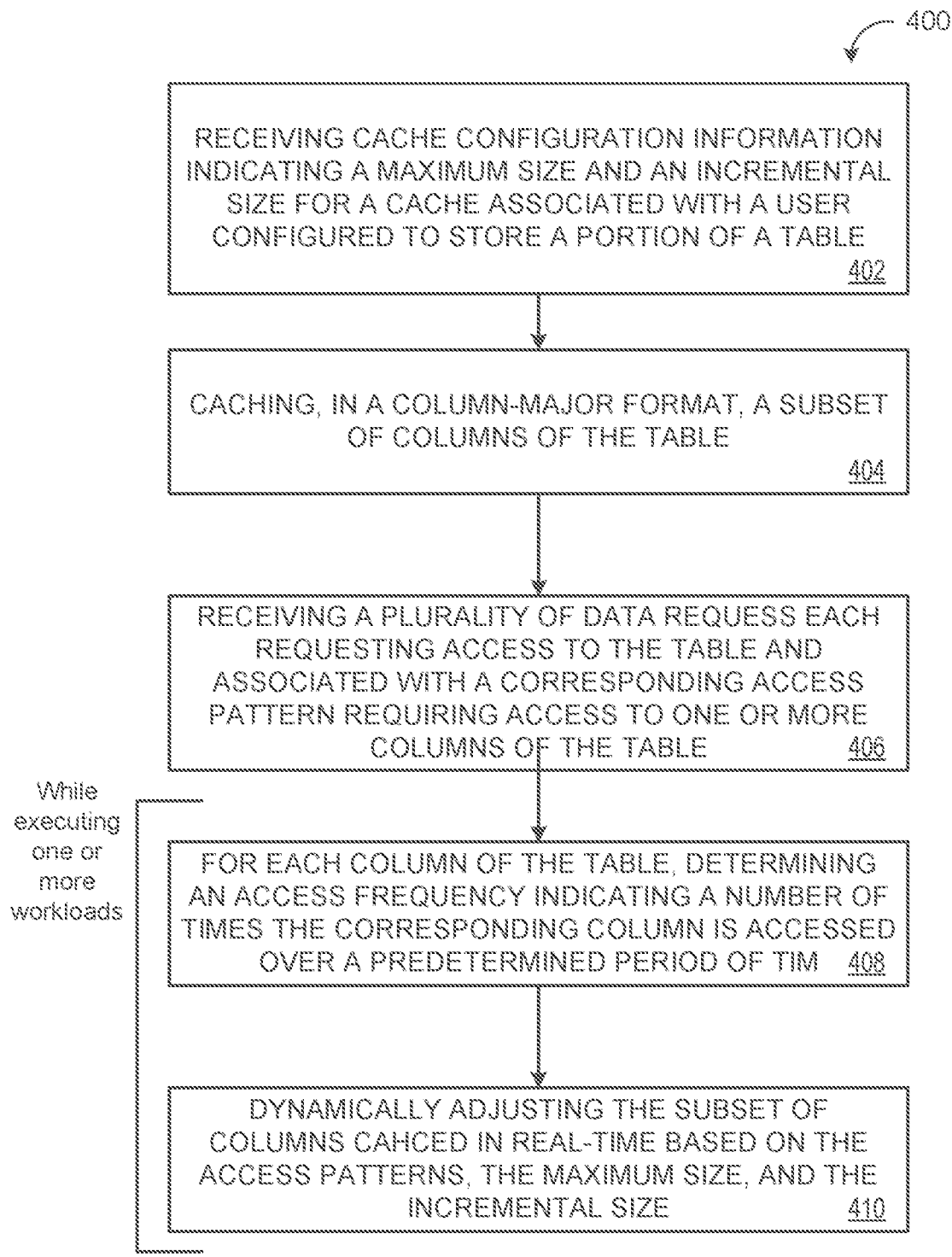
FIG. 4 is a flowchart of an example arrangement of operations for a method of providing an elastic columnar cache.

FIG. 4 is a flowchart of an exemplary arrangement of operations for a method 400 for elastic columnar cache. The method 400, at operation 402, includes receiving, at data processing hardware 144, cache configuration information 22 indicating a maximum size 24 and an incremental size 26 for a cache 160 associated with a user 12. The cache 160 is configured to store a portion of a table 158 stored on memory hardware 146 in communication with the data processing hardware 144. The table 158 is stored on the memory hardware 146 in a row-major format and includes a plurality of columns 310 and a plurality of rows.

At operation 404, the method 400 includes caching, by the data processing hardware 144, in a column-major format, a subset of the plurality of columns 310 of the table 158 in the cache 160 associated with the user 12. The method 400 includes, at operation 406, receiving, at the data processing hardware 144, a plurality of data requests 20. Each data request 20 requests access to the table 158 stored on the memory hardware 146 and is associated with a corresponding access pattern 180 requiring access to one or more of the plurality of columns 310 of the table 158.

While executing one or more workloads on the data processing hardware 144, the method 400 includes, at operation 408, for each column 310 of the plurality of columns 310 of the table 158, determining, by the data processing hardware 144, an access frequency 182 indicating a number of times the corresponding column 310 is accessed over a predetermined time period based on the corresponding access pattern 180 associated with each of the plurality of data requests 20. At operation 410, the method 400 includes dynamically adjusting, by the data processing hardware 144, the subset of the plurality of columns 310 cached in the column-major format in real-time based on the access patterns 180, the maximum size 24 for the cache 160, and the incremental size 26 for the cache 160.

Figure 5:
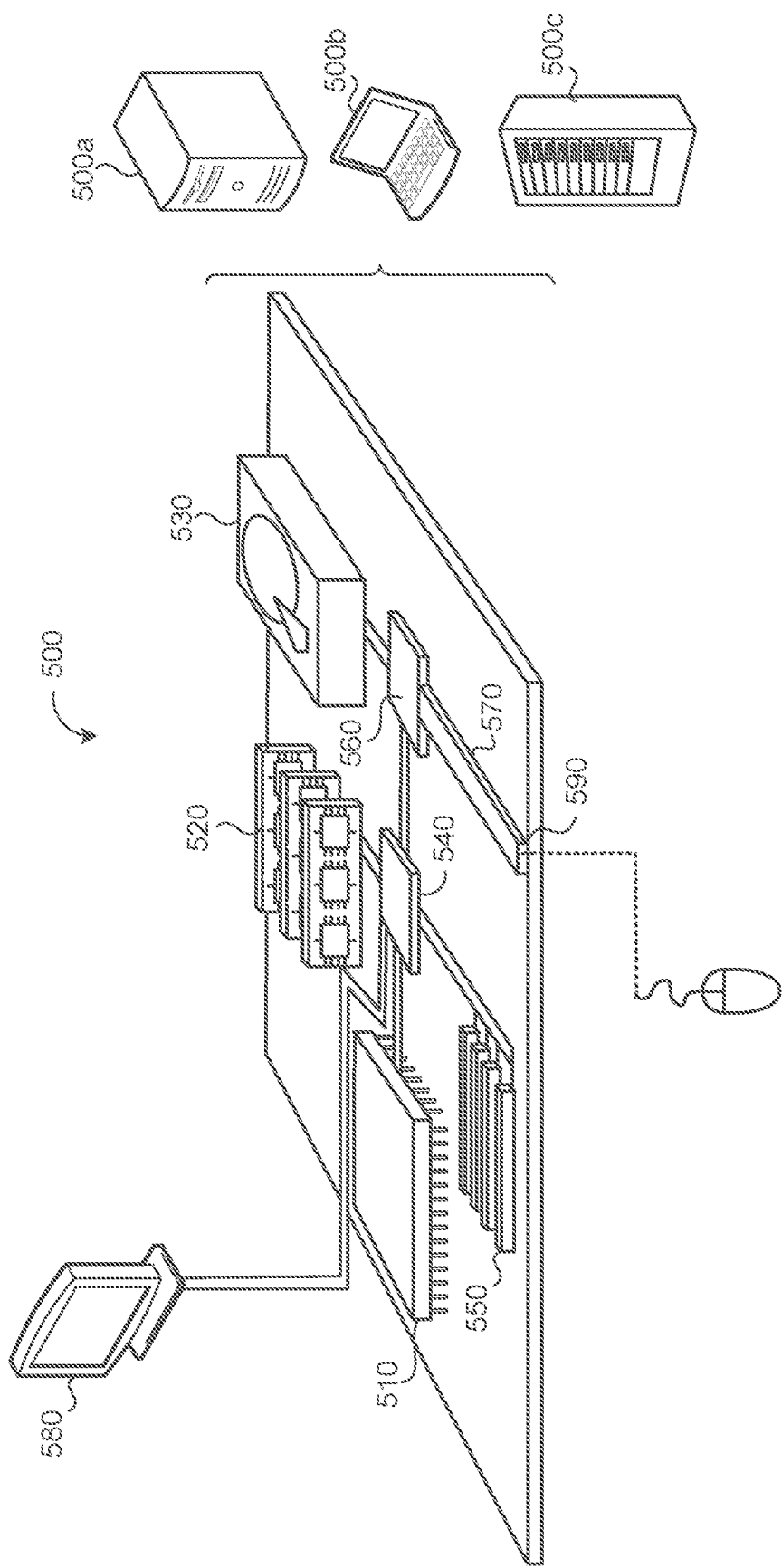
FIG. 5 is a schematic view of an example computing device that may be used to implement the systems and methods described herein.

FIG. 5 is schematic view1 of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the disclosure described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e g, through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a users client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising:
    obtaining, from a user device, cache configuration information indicating an incremental size for a cache associated with a user, the cache configured to store a portion of a table stored on memory hardware in communication with the data processing hardware, the table comprising a plurality of columns and a plurality of rows, the incremental size indicating an amount of cache that may be allocated or deallocated from the cache during dynamic adjustment;
    caching, in column-major format, a subset of the plurality of columns of the table in the cache associated with the user;
    receiving a plurality of data requests, each data request of the plurality of data requests requesting access to the table stored on the memory hardware;
    in response to receiving the plurality of data requests, dynamically adjusting the subset of the plurality of columns by:
        increasing a size of the cache by the amount equal to the incremental size; or
        decreasing the size of the cache by the amount equal to the incremental size;
    receiving a second plurality of data requests, each data request of the second plurality of data requests requesting access to the table stored on the memory hardware;
    based on receiving the second plurality of data requests, determining that increasing the size of the cache by the amount equal to the incremental size exceeds a maximum size; and
    based on determining that increasing the size of the cache by the amount equal to the incremental size would exceed the maximum size, declining to increase the size of the cache.

2. The method of claim 1, wherein the operations further comprise, for each respective column of the plurality of columns of the table, determining an access frequency indicating a number of times the respective column is accessed over a predetermined time period based on a respective access pattern associated with each of the plurality of data requests.

3. The method of claim 2, wherein dynamically adjusting the subset of the plurality of columns cached in the column-major format comprises removing one or more columns from the subset of the plurality of columns in the cache, the removed one or more columns associated with access frequencies that satisfy a contraction access frequency threshold.

4. The method of claim 2, wherein dynamically adjusting the subset of the plurality of columns cached in the column-major format comprises adding one or more columns to the subset of the plurality of columns in the cache, the added one or more columns associated with access frequencies that satisfy an expansion access frequency threshold.

5. The method of claim 1, wherein caching the subset of the plurality of columns comprises generating one or more table fragments each comprising a respective portion of one or more of the plurality of columns of the table.

6. The method of claim 1, wherein the cache comprises shared memory accessible by one or more workloads executing on the data processing hardware.

7. The method of claim 6, wherein dynamically adjusting the subset of the plurality of columns cached in the column-major format comprises dynamically adjusting the subset of the plurality of columns cached in the column-major format without restarting any of the one or more workloads.

8. The method of claim 1, wherein:
    the cache comprises a plurality of segments; and
    dynamically adjusting the subset of the plurality of columns cached in the column-major format comprises grouping columns together in segments based on corresponding access patterns.

9. The method of claim 8, wherein grouping the plurality of columns in segments based on the corresponding access patterns comprises grouping infrequently accessed columns together.

10. A system comprising:
    data processing hardware; and
    memory hardware in communication with the data processing hardware, the memory hardware storing instructions that when executed on the data processing hardware cause the data processing hardware to perform operations comprising:
        obtaining, from a user device, cache configuration information indicating an incremental size for a cache associated with a user, the cache configured to store a portion of a table stored on memory hardware in communication with the data processing hardware, the table comprising a plurality of columns and a plurality of rows, the incremental size indicating an amount of cache that may be allocated or deallocated from the cache during dynamic adjustment;
        caching, in column-major format, a subset of the plurality of columns of the table in the cache associated with the user;
        receiving a plurality of data requests, each data request of the plurality of data requests requesting access to the table stored on the memory hardware;
        in response to receiving the plurality of data requests, dynamically adjusting the subset of the plurality of columns by:
            increasing a size of the cache by the amount equal to the incremental size; or
            decreasing the size of the cache by the amount equal to the incremental size;
        receiving a second plurality of data requests, each data request of the second plurality of data requests requesting access to the table stored on the memory hardware;
        based on receiving the second plurality of data requests, determining that increasing the size of the cache by the amount equal to the incremental size exceeds a maximum size; and
        based on determining that increasing the size of the cache by the amount equal to the incremental size would exceed the maximum size, declining to increase the size of the cache.

11. The system of claim 10, wherein the operations further comprise, for each respective column of the plurality of columns of the table, determining an access frequency indicating a number of times the respective column is accessed over a predetermined time period based on a respective access pattern associated with each of the plurality of data requests.

12. The system of claim 11, wherein dynamically adjusting the subset of the plurality of columns cached in the column-major format comprises removing one or more columns from the subset of the plurality of columns in the cache, the removed one or more columns associated with access frequencies that satisfy a contraction access frequency threshold.

13. The system of claim 11, wherein dynamically adjusting the subset of the plurality of columns cached in the column-major format comprises adding one or more columns to the subset of the plurality of columns in the cache, the added one or more columns associated with access frequencies that satisfy an expansion access frequency threshold.

14. The system of claim 10, wherein caching the subset of the plurality of columns comprises generating one or more table fragments each comprising a respective portion of one or more of the plurality of columns of the table.

15. The system of claim 10, wherein the cache comprises shared memory accessible by one or more workloads executing on the data processing hardware.

16. The system of claim 15, wherein dynamically adjusting the subset of the plurality of columns cached in the column-major format comprises dynamically adjusting the subset of the plurality of columns cached in the column-major format without restarting any of the one or more workloads.

17. The system of claim 10, wherein:
the cache comprises a plurality of segments; and
dynamically adjusting the subset of the plurality of columns cached in the column-major format comprises grouping columns together in segments based on corresponding access patterns.

18. The system of claim 17, wherein grouping the plurality of columns in segments based on the corresponding access patterns comprises grouping infrequently accessed columns together.

* * * * *